118,668

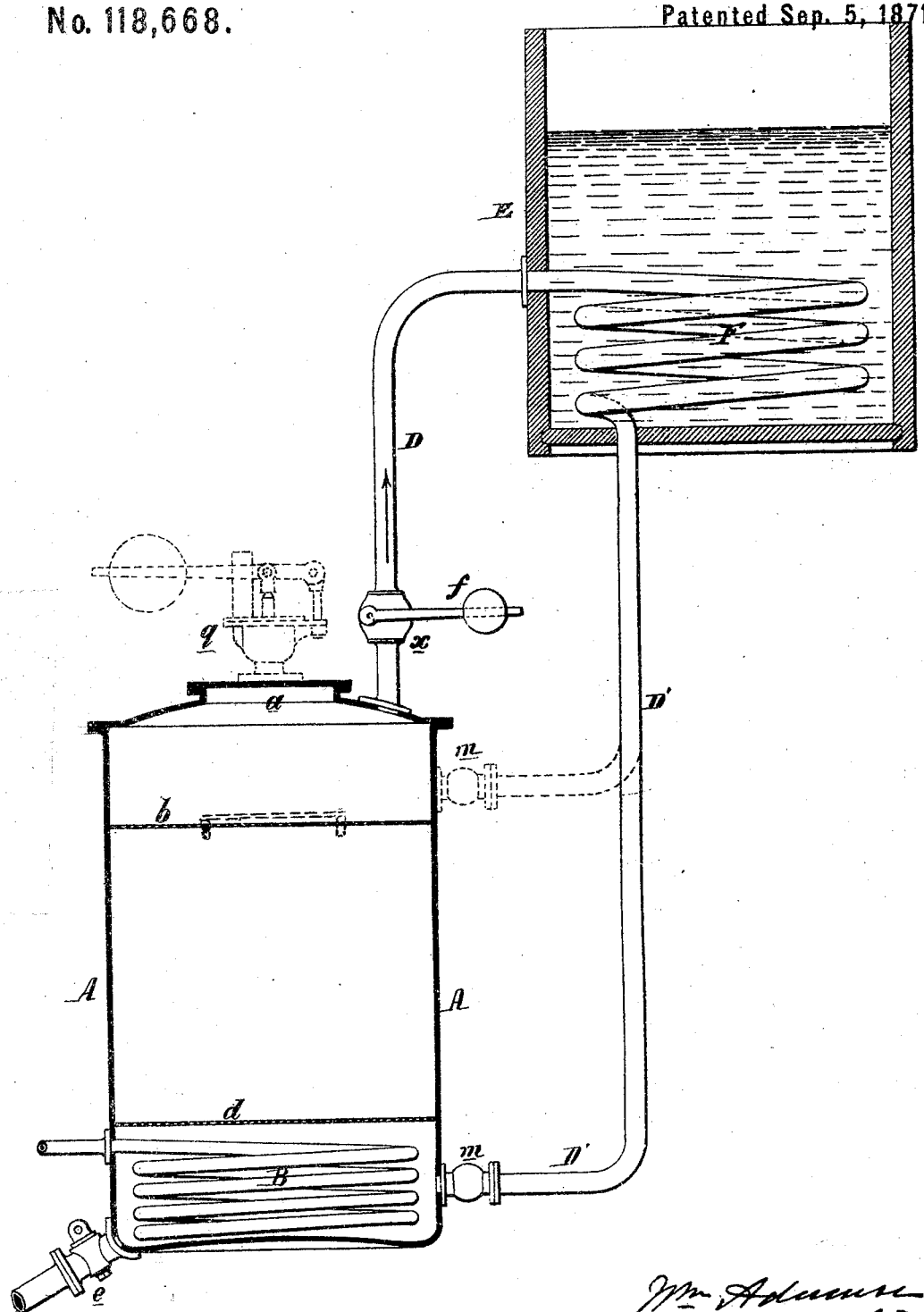

UNITED STATES PATENT OFFICE.

WILLIAM ADAMSON, OF PHILADELPHIA, PENNSYLVANIA.

IMPROVEMENT IN APPARATUS AND PROCESSES FOR TREATING ANIMAL AND VEGETABLE FIBERS.

Specification forming part of Letters Patent No. 118,668, dated September 5, 1871.

*To all whom it may concern:*

Be it known that I, WILLIAM ADAMSON, of Philadelphia, county of Philadelphia, State of Pennsylvania, have invented a Process of and Apparatus for Treating Animal and Vegetable Fibers, &c., of which the following is a specification:

My invention consists in subjecting to hydrocarbons under heat and pressure, or to hydrocarbon vapors under heat and pressure, animal and vegetable fibers, such as wool, hair, cotton-waste, &c., or fiber-bearing ligneous or vegetable substances. The object of my invention is to thoroughly and rapidly cleanse wool, hair, dirty cotton-waste, and other fibers, and to extract therefrom the oily and fatty matters, and to set free the fibers of wood, stalks, &c., to be used as paper-stock or for textile manufactures, while resinous and gummy matters are obtained as extracts. My invention further consists of certain apparatus, fully described hereinafter, for carrying my invention into effect.

Heated hydrocarbons have a tendency to dissolve the oily and fatty animal matter of wool, hair, feathers, &c., and the grease and oil with which dirty cotton-waste and other vegetable fibers are frequently impregnated, the fibers being thereby cleansed while the oil and fatty matter are extracted. Heated hydrocarbons have also a like tendency to dissolve the gummy, resinous, and other matter of woods and other fiber-bearing vegetable substances, thereby setting free the fibers and rendering them available for paper-stock or textile manufactures, while a valuable extract is obtained. I have found, however, by practical tests, that the desired results can be more rapidly and effectually attained by treating the above materials with hydrocarbons under heat and pressure, and that hydrocarbon vapors under heat and pressure, or the vapor combined with the direct application of hydrocarbons under heat and pressure, are still more effective and rapid in their operation. Many modes of and appliances for subjecting the fibers or fiber-bearing substances to liquid hydrocarbons under pressure, and causing the same to circulate through the material, will readily suggest themselves to those familiar with processes to which my invention is most nearly allied, and it will be unnecessary to cite more than one example of apparatus which may be employed. The material, for instance, may be placed with volatile hydrocarbons, such as benzine, benzole, or gasoline, in a closed vessel, and the whole heated by a steam-coil or otherwise, the vessel being furnished with a safety-valve for determining the pressure; or, if desired, the liquid volatile hydrocarbons, in a heated state, may be forced, by means of a circulating-pump, continuously through the vessel and through its contents until the desired result is obtained. I prefer, however, to apply hydrocarbon vapors under pressure to the above materials, and to use for that purpose apparatus substantially like that illustrated in the accompanying drawing, in which A is a vessel of such material as will resist the chemical action of the contents and withstand the pressure to which it may be desired to subject it. The vessel is furnished with a suitable detachable cover, $a$, and with two perforated or wire-gauze diaphragms or gratings, $b$ and $d$, both extending across the vessel, the former near the top of the same and the latter near the bottom, as shown in the drawing. A steam-coil, B, communicating with any adjacent generator, is placed within the vessel below the lower diaphram, and at the bottom of the vessel is a suitable discharge-pipe and cock, $e$. A pipe, D, extends from the top of the vessel to a condenser, E, within which it assumes the form of a coil or worm, communicating with a pipe, D', which has its outlet in the vessel A beneath the lower diaphragm. The continuity of the pipe D is interrupted by a valve-chest, $x$, containing a valve opening upward and depressed by a lever, $f$, with a force dependent upon the adjustment of its weight. I place the material to be operated on in the vessel A, between the two diaphragms $b$ and $d$, and introduce into the space below the lower diaphragm a supply of hydrocarbon, by preference such as is of a volatile character, benzine, for instance, or benzole, gasoline, or naphtha, which is heated or vaporized by the steam-coil B or other suitable heating appliances. The vapor of the volatile hydrocarbons ascends and permeates the material, and passes off through the pipe D to the worm, whence it returns in the form of liquid hydrocarbon to the space in the vessel A below the diaphragm $d$, to again assume the form of vapor which passes through the material in the vessel as before, the process being continued until the desired end is attained. Should it be desired to employ both vaporous and liquid hydrocarbons under pressure, the pipe D', instead of communicating with the vessel at a point below the lower diaphragm $d$, may terminate in the said vessel above the upper diaphragm $b$, in which case the condensed vapors will pass from the condenser directly onto the said diaphragm, and percolate through the material until the liquid reaches a point where it is again vaporized. In this case descending currents of liquid hydrocarbon will act on the material simultaneously with the ascending hydrocarbon vapors. As regards the amount of pressure to be employed, that will depend partly on the option and judgment of the operator, and partly on the character of the material to be operated upon. I have found that under a pressure of about five pounds per square inch wool or dirty waste can be rapidly cleaned, and its oily matter extracted. With a pressure of from ten to fifteen pounds per square inch I have succeeded in depriving pine shavings of their gummy and resinous matter, and thereby rendering them available as paper-stock. In treating other animal or vegetable fibers or fiber-bearing vegetable substances, it may be advisable to impart a much greater pressure. It will be unnecessary, however, to give minute data of different pressures for different materials, as the rule the greater the pressure and heat the more rapid will be the effect prevails in treating all, or nearly all, of the above materials, and the limits of pressure will, as before remarked, depend in a great measure on the judgment of the operator. The vessel A may be furnished with a supplementary weighted valve, $q$, loaded a little in excess of the valve $x$, so as to insure safety. I place a check-valve, $m$, opening inward toward the interior of the vessel A, at the junction of the pipe D with the said vessel.

I do not here claim the treating of materials with hydrocarbons under heat and pressure; but I claim—

1. The process of treating animal and vegetable fibers and fiber-bearing vegetable substances with hydrocarbon or hydrocarbon vapor, or both, under heat and determinate pressure, substantially as set forth.

2. Treating animal and vegetable fibers and fiber-bearing vegetable substances by causing a circulation through them of hydrocarbons or hydrocarbon vapors, or both, under heat and pressure, substantially in the manner described.

3. A vaporizing-vessel, A, and condenser E, in combination with a pressure-valve in the pipe or passage through which the vapor passes into the condenser.

In testimony whereof I have signed my name to this specification in the presence of two subscribing witnesses.

WILLIAM ADAMSON.

Witnesses:
   WM. A. STEEL,
   LOUIS BOSWELL.